S. CRAIG.
TRUCK.
APPLICATION FILED FEB. 6, 1909.
938,301.
Patented Oct. 26, 1909.
2 SHEETS—SHEET 1.
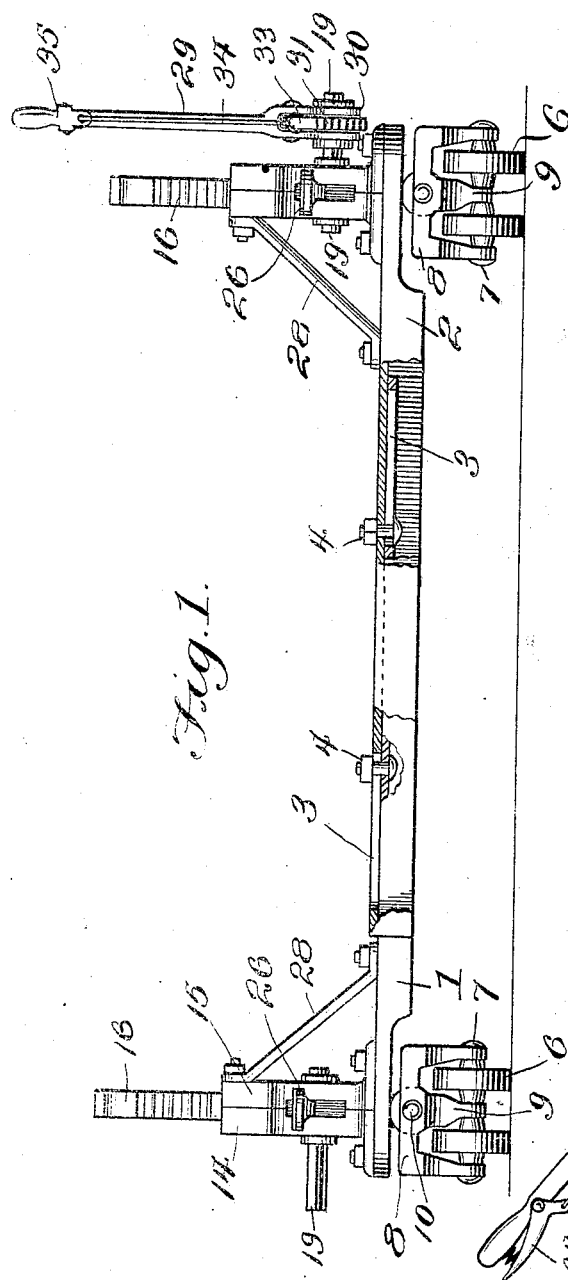
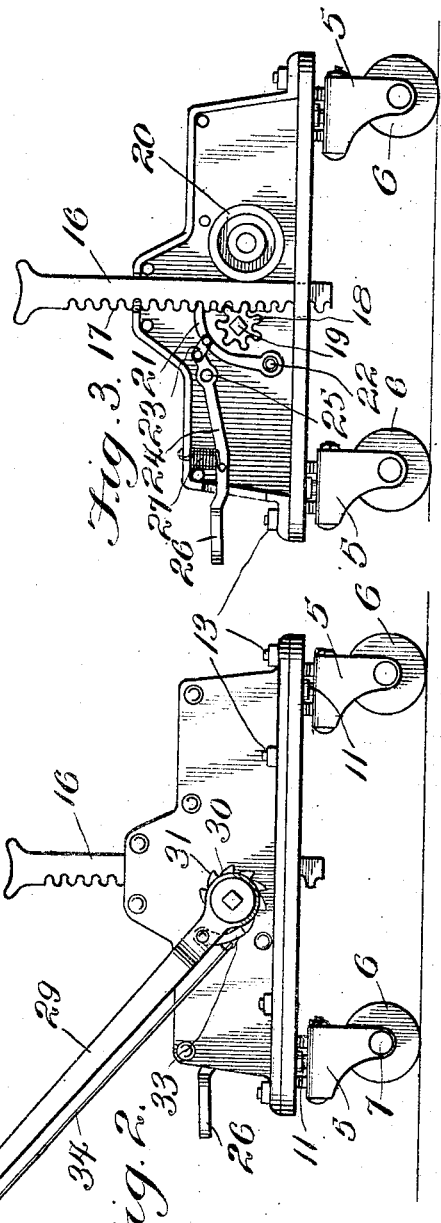
Witnesses
Inventor
Samuel Craig,
By Victor J. Evans
Attorney

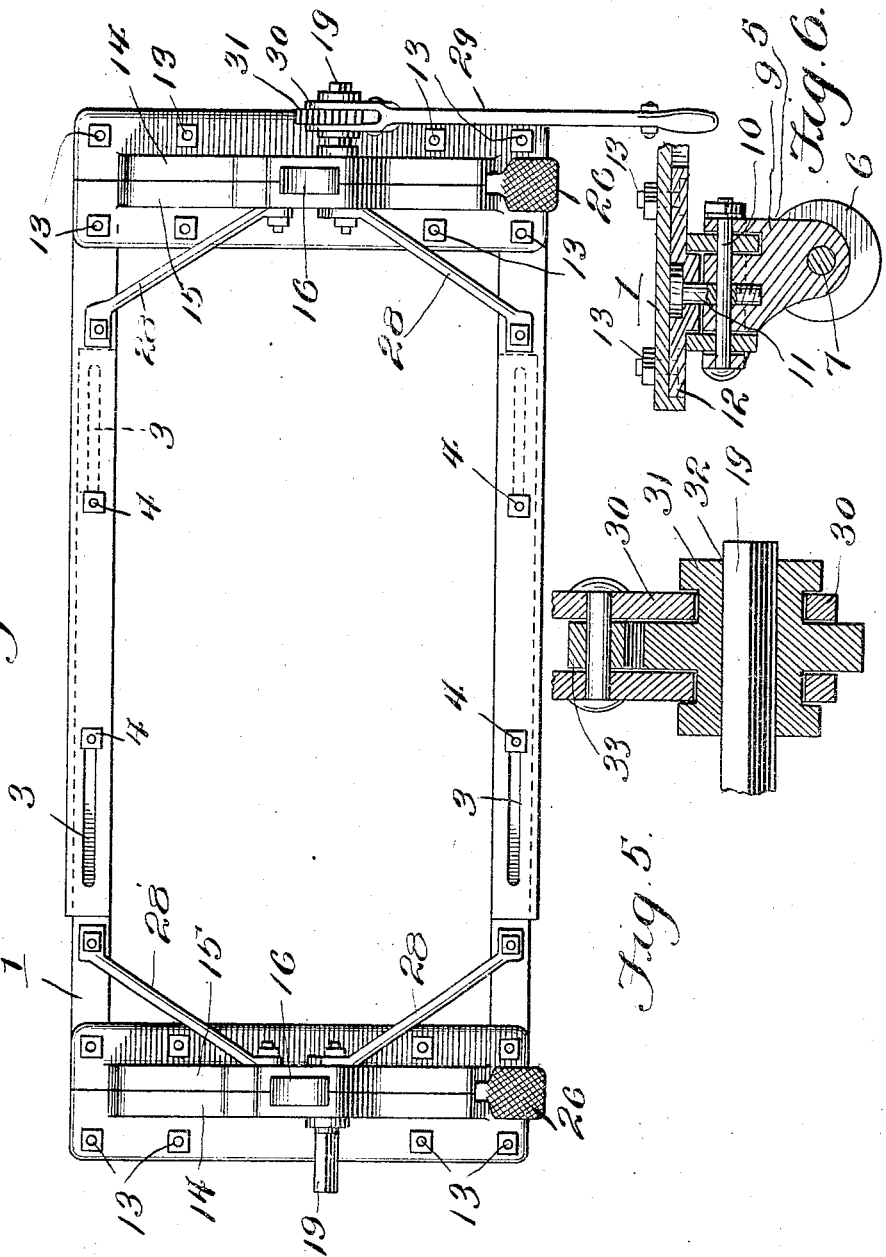

UNITED STATES PATENT OFFICE.

SAMUEL CRAIG, OF DECATUR, ILLINOIS.

TRUCK.

938,301.   Specification of Letters Patent.   Patented Oct. 26, 1909.

Application filed February 6, 1909. Serial No. 476,433.

*To all whom it may concern:*

Be it known that I, SAMUEL CRAIG, a citizen of the United States of America, residing at Decatur, in the county of Macon and State of Illinois, have invented new and useful Improvements in Trucks, of which the following is a specification.

This invention relates to trucks designed more particularly for lifting and moving automobiles or motor carriages, and one of the principal objects of the invention is to provide reliable and efficient means for applying a lifting medium underneath the two axles of the vehicle for raising the wheels off the ground, said truck then being movable to carry the vehicle to any required place.

Another object of the invention is to provide a wheeled truck having lifting jacks secured thereto and means for adjusting the truck so that the jacks will be disposed immediately under the axles of a motor vehicle in order that the same may be lifted and conveyed to any required place or during repairs.

These and other objects may be attained by means of the construction illustrated in the accompanying drawings, in which,—

Figure 1 is a side elevation and partial section of a truck made in accordance with my invention, portions being shown broken away to better illustrate the construction. Fig. 2 is an end view of the truck. Fig. 3 is a view in elevation of one of the lifting jacks, one of the members of the casing for covering said jacks being removed to illustrate the interior construction. Fig. 4 is a top plan view of the truck. Fig. 5 is a detail sectional view of the lower end of the ratchet lever for operating the lifting bar of the jack. Fig. 6 is a detail sectional view illustrating the manner of mounting the caster wheels under the truck.

Referring to the drawing, the numeral 1 designates one section of a rectangular adjustable frame, and 2 is the other section of the same, said frame being preferably made of strong sheet iron or steel, and the section 2 being adjustable relatively to the section 1 by means of slots 3 and bolts 4. The rectangular frame is mounted upon casters 5, one at each corner of the frame, said casters comprising a pair of wheels 6 journaled upon an axle 7 mounted in a yoke 8 having a central bearing member 9 between the wheels 6. The yoke 8 is pivoted at 10 to a stub shaft 11, the upper end of which is seated in a plate 12 secured underneath the frame 1, 2 by means of bolts 13. By this means the caster wheels may rotate upon the axis 11 and also upon the axle 7.

Mounted upon each end of the truck frame is a lifting element comprising a casing composed of two members 14, 15. As these lifting elements are substantially identical at the opposite ends of the truck, the description of one will serve as a description of both. The two members 14, 15 of the casing are provided with flanges connected by the bolts 13 to the truck frame, and within said casing is a rack bar 16 provided with teeth 17 upon one side thereof. A pinion 18 mounted upon the squared shaft 19 journaled in the casing meshes with the teeth 17. The rack bar 16 extends down through the casing and is held in mesh with the pinion 18 by means of a friction idler wheel 20 which bears against the edge of the rack bar opposite the teeth 17, as shown more particularly in Fig. 3. A pawl 21 pivoted at 22 within the casing engages the teeth 17 of the rack bar, and connected to the pawl 21 is a link 23, said link being connected to a foot lever 24 pivoted at 25 within the casing and extending through said casing and provided with a roughened foot pedal 26. A spring 27 connects the foot lever 24 with the casing and holds the pawl 21 up to the teeth 17. In order to release the pawl 21, a foot placed upon the pedal 26 will withdraw the pawl from the teeth and permit the rack bar 16 to descend. The casing 14, 15 is sustained by diagonal braces 28.

To operate the lifting bars 16 a ratchet wrench 29 is provided having a bifurcated end 30 in which is journaled a ratchet wheel 31, said ratchet wheel having a squared aperture 32 extending therethrough to receive the squared projecting end of the shaft 19. A pawl 33 is connected to the lever 29 to engage the teeth of the ratchet wheel 31, said pawl being connected by a rod 34 to the spring handle member 35. The lever 29 is readily removable from the end of the squared shaft 19 to be used at either end of the truck.

The operation of my invention may be briefly described as follows:—The lifting bars 16 are adjusted to the required distances apart by means of the bolts 4 and slots 3 to occupy positions immediately under the axles of the vehicle to be lifted.

The levers 29 are then applied to the squared ends of the shafts 19 to raise the vehicle from the floor, after which the truck is pushed to any required place for repairs or for storing. By putting the foot upon the pedal 26 the lifting bar 16 descends, and the motor vehicle is again lowered to rest upon its tires in an obvious manner.

From the foregoing, it will be obvious that a truck made in accordance with my invention can be readily adjusted to lift a motor carriage without the slightest injury to any of the parts and without straining the mechanism; that the truck can be readily pushed under the vehicle and can be easily removed therefrom, the operation being quick, reliable and efficient.

I claim:—

In a device of the character described, a rectangular frame, caster wheels pivotally mounted in pairs in yokes underneath said frame, means for adjusting said frame longitudinally, lifting elements on said frame, each of said elements consisting of a casing, a rack bar mounted to move through the casing, a pinion meshing with the rack bar, a friction wheel for holding the rack bar in mesh with the pinion, a pawl, a foot lever connected to said pawl, a spring for holding said foot lever in position to keep the pawl engaged with the rack bar, and a removable ratchet lever for rotating the pinion.

In testimony whereof I affix my signature in presence of two witnesses.

SAMUEL CRAIG.

Witnesses:
 HARRY W. CRABB,
 GEORGE N. WOOD.